Sept. 29, 1925.
D. BLUMBERG
TRANSMISSION BRAKE
Filed Feb. 11, 1925
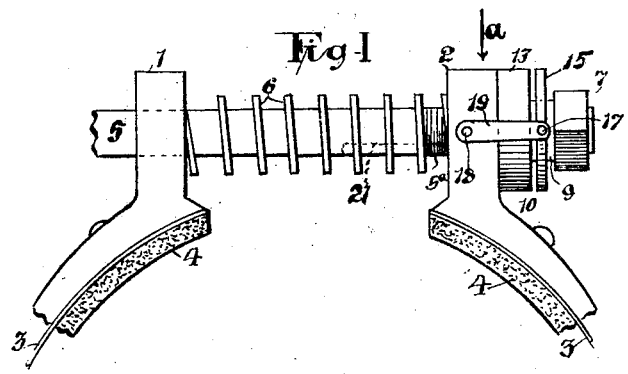
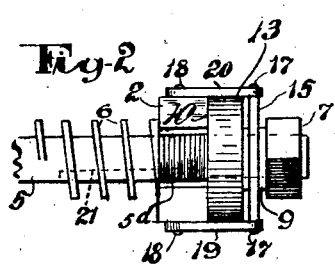
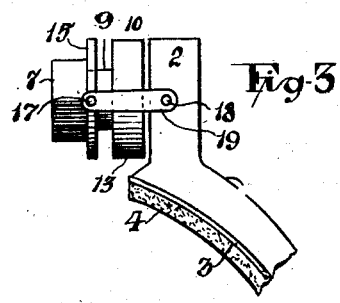
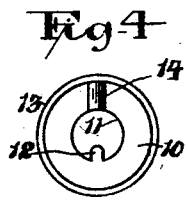
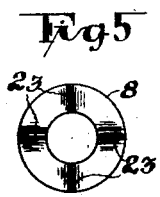
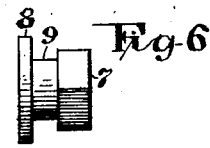
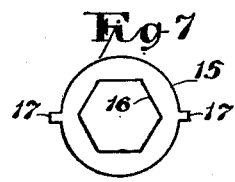
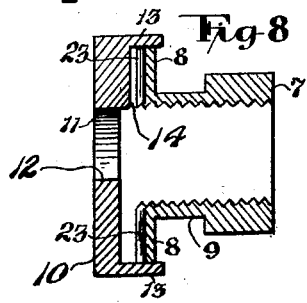
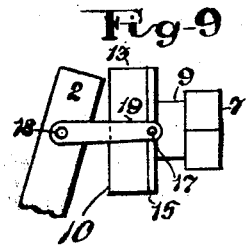
INVENTOR
David Blumberg
BY
Geo. D. Phillips ATTORNEY Patented Sept. 29, 1925.

1,555,179

UNITED STATES PATENT OFFICE.

DAVID BLUMBERG, OF BRIDGEPORT, CONNECTICUT.

TRANSMISSION BRAKE.

Application filed February 11, 1925. Serial No. 8,357.

*To all whom it may concern:*

Be it known that I, DAVID BLUMBERG, citizen of the United States, residing at Bridgeport, in the county of Fairfield and State of Connecticut, have invented certain new and useful Improvements in Transmission Brakes, of which the following is a specification.

This invention relates to automobile transmission brake, and particularly to the brake band construction, it being an improvement on my former application No. 2,494, wherein the pedal shaft nut was located in one of the ears of the brake band and was thrown out of alignment with the pedal shaft when the ear was tilted in installing a new lining. This objection is entirely overcome in the present application by pivotally supporting the nut to the ear so that it can be brought in alignment with the pedal shaft regardless of the position of the ear.

The novelty of construction and advantage of the device will be fully understood from the following description and claims when taken in connection with the annexed drawings, in which Figure 1 represents a broken view of the ears, brake band, lining, and pedal shaft showing the nut pivoted to one of the ears.

Figure 2 is an upper plan view of the nut carrying ear looking in the direction of arrow *a* of Figure 1.

Figure 3 is a broken elevation of the ear showing the reversed position of the nut.

Figure 4 is a detail inside view of the check washer.

Figure 5 is a detail inside view of the nut.

Figure 6 is a detail elevation of the nut.

Figure 7 is a detail view of the yoke.

Figure 8 is an enlarged central sectional view of the check washer and nut, and

Figure 9 is a broken view of the ear tilted showing the vertical position of the nut.

In Figure 1 is shown the usual transmission mechanism comprising the ears 1, 2, brake band 3, lining 4, pedal shaft 5, and tension spring 6, of the Ford automobile.

The pedal shaft nut, Figure 6, comprises the hexagon head 7, flange 8 and intervening neck 9. The check washer 10, Figures 4 and 8, has the central shaft opening 11, key 12, flange 13, and projection 14.

In assembling the nut mechanism, the flange 8 is inserted in the recessed check washer 10, Figure 8, the yoke 15, having the hexagon opening 16, Figure 7, is passed over the hexagon head 7 of the nut and on to the neck 9. As this neck is much smaller than the hexagon opening of the yoke 15, the nut will have more or less play therein. The projections 17 of the yoke 15 is pivotally connected to the pins 18 of the ear 2 by the levers 19, 20.

In mounting the check washer 10 on to the shaft 5, its key 12 will engage the keyway 21 of the shaft. As the nut is turned on the threaded portion 5$^a$ of the shaft against the tension of the spring 6, the depressions 23, Figures 5 and 8, will frictionally ride over the projection 14 of the check washer 10, but when the pedal shaft is rotated, the washer and nut will also rotate with it by means of the projection 14, recesses 23 and key 12. Unscrewing the nut against the tension stored up in the spring 6 will expand the opening between the ears and carry the nut away from the end of the shaft so that the latter can be withdrawn.

When the shaft is removed the nut is swung over the ear, Figure 3, so that the brake band and ear may be moved laterally to avoid encountering any obstructions of the casing, not shown, when it is necessary to remove the band to install a new lining. When a new lining is installed, and the brake band again mounted on the drum, not shown, the full thickness of the lining will tend to throw the ear at an angle as shown in Figure 9. If the nut was installed in the ear, it would be difficult to enter the nut on the threaded end of the shaft, but with the nut pivoted to the ear as shown, it can be held in perfect alignment with the shaft. The free play of the nut in the yoke 15 also gives it adjustment in any direction to bring it in line with the incoming shaft.

Having thus described my invention what I claim is:—

1. Transmission mechanism comprising a brake band and an ear mounted on one of its free ends, and a shaft having a threaded end extending through the ear, a nut for said threaded end pivotally attached to the ear so that the nut will have a movement independent of the ear.

2. In combination with a brake band ear, a nut, pivotally connected thereto so that the nut will have an independent movement with respect to the ear.

3. In combination with a brake band ear and a pedal shaft having a threaded end, a nut having a flange, head, and interposed reduced neck, a check washer between the ear and said flange, said washer having means to rotatively connect it with the shaft, a yoke freely embracing the neck of the nut, and means to pivotally connect the plate to the ear.

4. In combination with a brake band ear and pedal shaft having a threaded end, a nut for said threaded end, and means for pivotally suspending said nut to the ear.

In testimony whereof I affix my signature.

DAVID BLUMBERG.